(12) United States Patent
Rozier

(10) Patent No.: US 11,318,841 B2
(45) Date of Patent: May 3, 2022

(54) VEHICLE CONTROL PANEL PROTECTION DEVICE

(71) Applicant: Julia Rozier, Orlando, FL (US)

(72) Inventor: Julia Rozier, Orlando, FL (US)

( * ) Notice: Subject to any disclaimer, the term of this patent is extended or adjusted under 35 U.S.C. 154(b) by 34 days.

(21) Appl. No.: 16/903,940

(22) Filed: Jun. 17, 2020

(65) Prior Publication Data

US 2020/0406749 A1 Dec. 31, 2020

Related U.S. Application Data

(60) Provisional application No. 62/866,063, filed on Jun. 25, 2019.

(51) Int. Cl.
*B60K 35/00* (2006.01)
*B60J 5/04* (2006.01)
*B60Q 3/217* (2017.01)

(52) U.S. Cl.
CPC ............. *B60K 35/00* (2013.01); *B60J 5/0468* (2013.01); *B60Q 3/217* (2017.02); *B60K 2370/12* (2019.05); *B60K 2370/794* (2019.05)

(58) Field of Classification Search
CPC .. B60K 2370/794; B60K 35/00; B60K 37/02; B60K 2370/12; B60Q 3/217; B60J 5/0468; B60J 3/002; B60J 7/062
USPC .................................. 296/37.8, 24.34, 146.1
See application file for complete search history.

(56) References Cited

U.S. PATENT DOCUMENTS

| | | | |
|---|---|---|---|
| 6,746,067 B2 * | 6/2004 | Schmidt ................. | B60K 37/06 296/37.13 |
| 8,002,179 B2 * | 8/2011 | Feit ........................ | B60K 35/00 235/382 |
| 2005/0018392 A1 * | 1/2005 | Strohmeier ........... | G06F 1/1632 361/679.55 |

\* cited by examiner

*Primary Examiner* — Joseph D. Pape
(74) *Attorney, Agent, or Firm* — The Iwashko Law Firm, PLLC; Lev Ivan Gabriel Iwashko

(57) ABSTRACT

A vehicle control panel protection device, including a main body to cover at least a portion of a vehicle control panel disposed on a portion of a door of a vehicle, at least one first fastener disposed on at least a portion of the main body, and at least one second fastener disposed on the vehicle control panel to detachably connect to the at least one first fastener.

3 Claims, 2 Drawing Sheets

VEHICLE CONTROL PANEL PROTECTION DEVICE

CROSS REFERENCE TO RELATED APPLICATION

This application claims the benefit of, and incorporates by reference, U.S. provisional patent application Ser. No. 62/866,063, entitled "Vehicle Control Panel Protection Device," which was filed on Jun. 25, 2019.

BACKGROUND

1. Field

The present general inventive concept relates generally to a protection device, and particularly, to a vehicle control panel protection device.

2. Description of the Related Art

Traditionally, if a rider of a vehicle opens a window and/or a door of the vehicle while it is raining, an interior portion of the window and/or the door will get wet. Despite the rain, the rider may need to open the window and/or the door for a variety of circumstances, such as cleaning the vehicle and/or leaving the vehicle to enter a building.

This can be problematic because it can potentially lead to an electrical malfunction when water seeps in. Specifically, an electrical controller disposed on the door can be damaged from the water contacting a portion of an interior of the electrical controller.

Therefore, there is a need for a protection device for a vehicle control panel that prevents damage from precipitation.

SUMMARY

The present general inventive concept provides a vehicle control panel protection device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle control panel protection device, including a main body to cover at least a portion of a vehicle control panel disposed on a portion of a door of a vehicle, at least one first fastener disposed on at least a portion of the main body, and at least one second fastener disposed on the vehicle control panel to detachably connect to the at least one first fastener.

The at least one first fastener may be disposed on an inner surface of the main body.

The vehicle control panel protection device may further include a sensor disposed on at least a portion of the main body to detect a topography of the vehicle control panel, and an illumination unit disposed on at least a portion of the main body to create an illuminated outline of the vehicle control panel on an outer surface of the main body based on the topography detected by the sensor.

The illumination unit may create the illuminated outline that includes at least one of a button, a lever, and a switch.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Vehicle Control Panel Protection Device 100
Main Body 110
Outer Surface 111
InnerSurface 112
Fasteners 120
First Fastener 121
Second Fastener 122
Third Fastener 123
Fourth Fastener 124
Sensor 130
Processing Unit 140
Illumination Unit 150
Power Source 160

Figure 1:
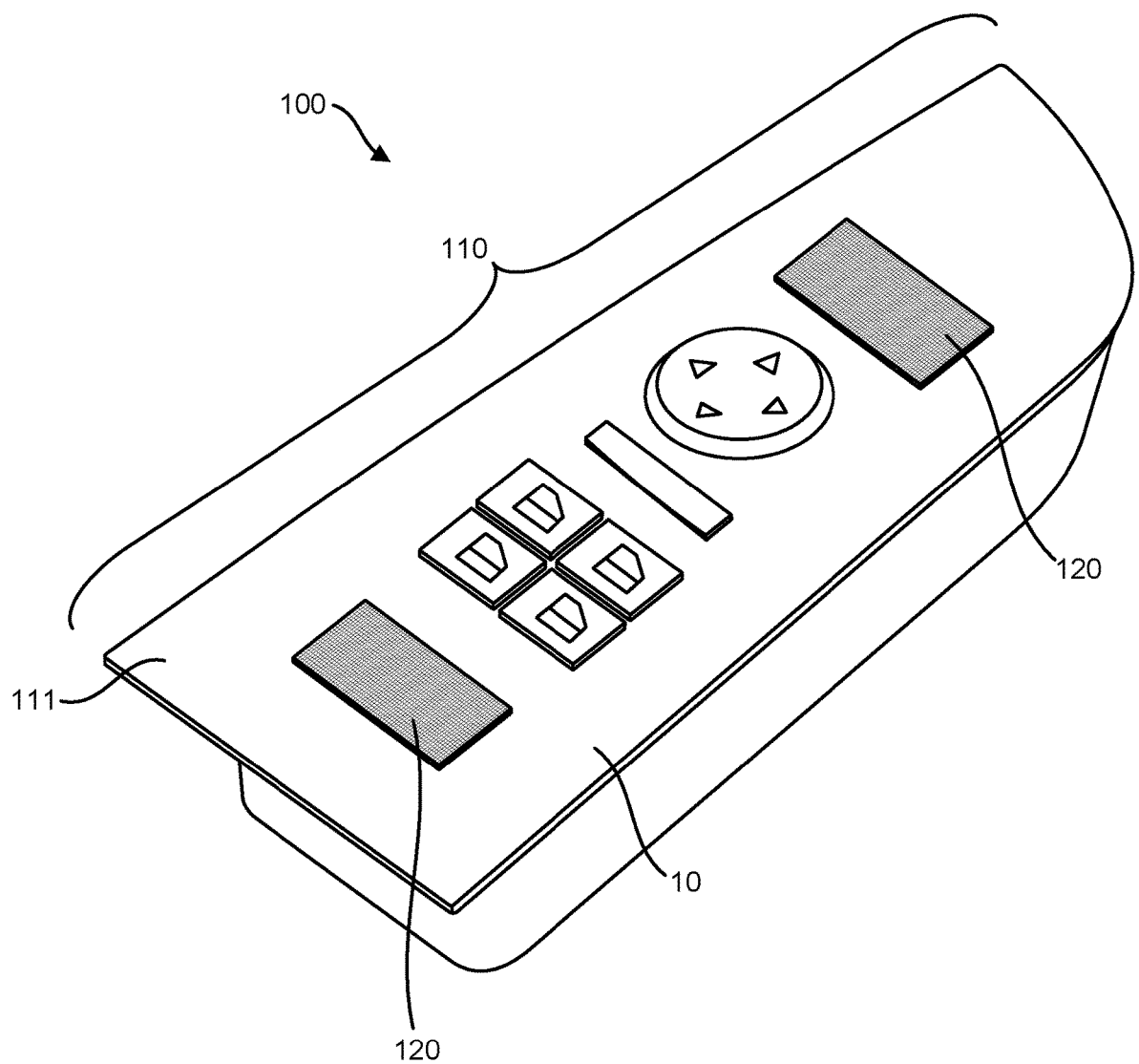
FIG. 1 illustrates a top view of a vehicle control panel protection device as disposed on a vehicle control panel, according to an exemplary embodiment of the present general inventive concept.

FIG. 1 illustrates a top view of a vehicle control panel protection device 100 as disposed on a vehicle control panel 10, according to an exemplary embodiment of the present general inventive concept.

Figure 2:
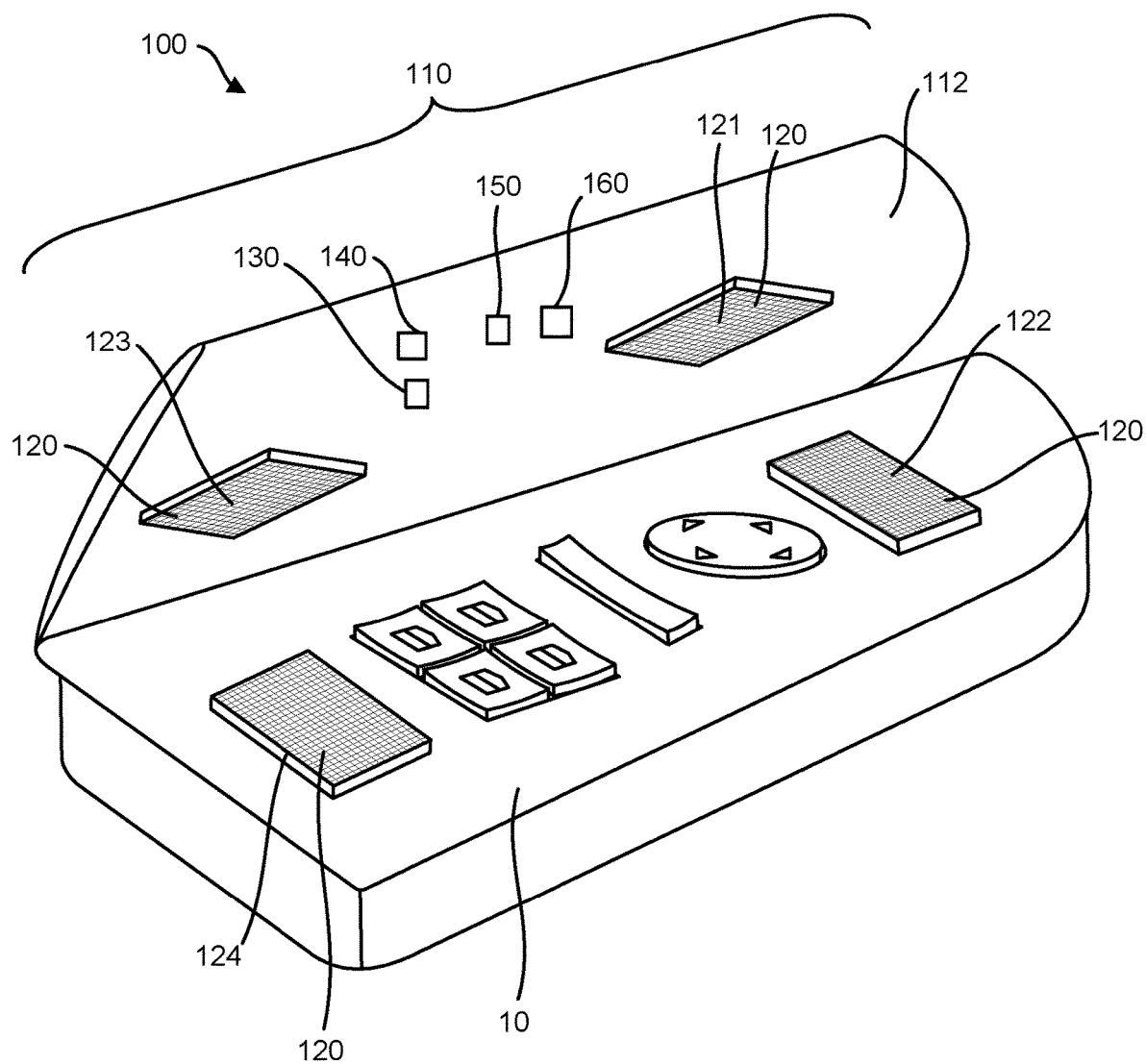
FIG. 2 illustrates an isometric view of the vehicle control panel protection device as removed from the vehicle control panel, according to an exemplary embodiment of the present general inventive concept.

FIG. 2 illustrates an isometric view of the vehicle control panel protection device 100 as removed from the vehicle control panel 10, according to an exemplary embodiment of the present general inventive concept.

The vehicle control panel protection device 100 may be constructed from at least one of metal, plastic, glass, and rubber, etc., but is not limited thereto.

The vehicle control panel protection device 100 may include a main body 110, a plurality of fasteners 120, a sensor 130, a processing unit 140, an illumination unit 150, and a power source 160, but is not limited thereto.

The main body 110 may include an outer surface 111 and an inner surface 112, but is not limited thereto.

Referring to FIGS. 1 and 2, the main body 110 is illustrated to have a rectangular prism shape. However, the main body 110 may be a square prism, circular, pentagonal, hexagonal, octagonal, or any other shape known to one of ordinary skill in the art, but is not limited thereto.

Moreover, the main body 110 may have a length and a width at least equivalent to a length and a width of a vehicle control panel 10 as disposed on a portion of a door of a vehicle, but is not limited thereto. Alternatively, the main body 110 may have a predetermined size to exceed a size of the vehicle control panel 10 based on a plurality of requirements of the vehicle. For example, the predetermined size of the main body 110 may be customized differently, such as between a car and/or a truck.

The main body 110 may cover at least a portion of the vehicle control panel 10. Moreover, the main body 110 may be flexible to deform in response to a touch by a user. More specifically, the main body 110 may deform in response to a force applied against the outer surface 111, such that the user may depress at least one button on the vehicle control panel 10.

Referring to FIGS. 1 and 2, the vehicle control panel protection device 100 is illustrated to have the plurality of fasteners 120 disposed thereon. However, the vehicle control panel protection device 100 may have at least one fastener 120.

The plurality of fasteners 120 may be at least one of a zipper, a buckle, a button, a snap, a clasp, an adhesive, and hooks and loops, but is not limited thereto.

The plurality of fasteners 120 may include a first fastener 121, a second fastener 122, a third fastener 123, and a fourth fastener 124, but is not limited thereto.

The first fastener 121 may be disposed on at least a portion of the inner surface 112 substantially near a first end of the main body 110. The third fastener 123 may be disposed on at least a portion of the inner surface 112 substantially near a second end of the main body 110. Additionally, the second fastener 122 may be disposed on at least a portion of the vehicle control panel 10 at a first position corresponding to the first fastener 121. The fourth fastener 124 may be disposed on at least a portion of the vehicle control panel 10 at a second position corresponding to the third fastener 123. As such, the first fastener 121 may be removably connected to the second fastener 122 and the third fastener 123 may be removably connected to the fourth fastener 124.

Therefore, the inner surface 112 of the main body 110 may be removably disposed on the vehicle control panel 10 to prevent precipitation from contacting a surface of the vehicle control panel 10, such that the precipitation may not damage an interior portion of the vehicle control panel 10. Instead, the precipitation may contact at least a portion of the outer surface 111.

The sensor 130 may include a precipitation sensor, a temperature sensor, and a topography sensor, etc., but is not limited thereto.

The processing unit 140 (or central processing unit, CPU) may include electronic circuitry to carry out instructions of a computer program by performing basic arithmetic, logical, control and input/output (I/O) operations specified by the instructions. The processing unit 140 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 140 may also include a microprocessor and a microcontroller.

The illumination unit 150 may include a light, such as a laser, but is not limited thereto.

The sensor 130 may detect a topography of the vehicle control panel 10. The sensor 130 may transmit the topography of the vehicle control panel 10 to the processing unit 140. The processing unit 140 may send an illumination signal to the illumination unit 150 to create an illuminated outline of the vehicle control panel 10 within at least a portion of the main body 110. More specifically, the illumination unit 150 may create the illuminated outline to surround at least one topographical feature of the vehicle control panel 10, such as a button, a lever, a switch, etc., but is not limited thereto. As such, the user may view the illuminated outline on the outer surface 111 of the main body 110. In other words, the illumination unit 150 may facilitate a determination by the user of a location of the at least one topographical feature of the vehicle control panel 10 while the vehicle control panel protection device 100 is disposed on the vehicle control panel 10.

The power source 160 may be at least one of a battery and a solar cell, but is not limited thereto. As such, the power source 160 may charge in response to exposure to a light source. The power source 160 may send power to at least one of the sensor 130, the processing unit 140, and the illumination unit 150.

Therefore, the vehicle control panel protection device 100 may protect the vehicle control panel 10, such that the precipitation does not reach the interior portion of the vehicle control panel 10.

The present general inventive concept may include a vehicle control panel protection device 100, including a main body 110 to cover at least a portion of a vehicle control panel 10 disposed on a portion of a door of a vehicle, at least one first fastener 120 disposed on at least a portion of the main body 110, and at least one second fastener 120 disposed on the vehicle control panel 10 to detachably connect to the at least one first fastener 120.

The at least one first fastener 120 may be disposed on an inner surface 112 of the main body 110.

The vehicle control panel protection device 100 may further include a sensor 130 disposed on at least a portion of the main body 110 to detect a topography of the vehicle control panel 10, and an illumination unit 150 disposed on at least a portion of the main body 110 to create an illuminated outline of the vehicle control panel 10 on an outer surface 111 of the main body 110 based on the topography detected by the sensor 130.

The illumination unit 150 may create the illuminated outline that includes at least one of a button, a lever, and a switch.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A vehicle control panel protection device, comprising:
   a main body to cover at least a portion of a vehicle control panel disposed on a portion of a door of a vehicle;
   at least one first fastener disposed on at least a portion of the main body;
   at least one second fastener disposed on the vehicle control panel to detachably connect to the at least one first fastener;
   a sensor disposed on at least a portion of the main body to detect a topography of the vehicle control panel; and
   an illumination unit disposed on at least a portion of the main body to create an illuminated outline of the vehicle control panel on an outer surface of the main body based on the topography detected by the sensor.

2. The vehicle control panel protection device of claim 1, wherein the at least one first fastener is disposed on an inner surface of the main body.

3. The vehicle control panel protection device of claim 1, wherein the illumination unit creates the illuminated outline that includes at least one of a button, a lever, and a switch.

\* \* \* \* \*